(12) United States Patent
Mohanty

(10) Patent No.: US 9,481,933 B2
(45) Date of Patent: Nov. 1, 2016

(54) COAXIAL LASER ASSISTED COLD SPRAY NOZZLE

(75) Inventor: Pravansu S. Mohanty, Canton, MI (US)

(73) Assignee: The Regents Of The University Of Michigan, Ann Arbor, MI (US)

(*) Notice: Subject to any disclaimer, the term of this patent is extended or adjusted under 35 U.S.C. 154(b) by 490 days.

(21) Appl. No.: 12/959,523

(22) Filed: Dec. 3, 2010

(65) Prior Publication Data

US 2011/0300306 A1  Dec. 8, 2011

Related U.S. Application Data

(60) Provisional application No. 61/266,639, filed on Dec. 4, 2009.

(51) Int. Cl.
*B05B 7/00* (2006.01)
*C23C 24/08* (2006.01)
(Continued)

(52) U.S. Cl.
CPC .......... *C23C 24/085* (2013.01); *B05B 7/0075* (2013.01); *B05B 7/1404* (2013.01); *B05B 7/1481* (2013.01); *B05B 7/16* (2013.01); *B05D 1/12* (2013.01); *B05D 3/06* (2013.01); *B23K 26/144* (2015.10); *B23K 26/1476* (2013.01);
(Continued)

(58) Field of Classification Search
CPC ......... C23C 24/04; C23C 4/12; C23C 30/00; B22F 1/02; B05B 7/1486; B05B 7/14; B05B 7/1404; B01J 4/001; B23K 26/0093; B23K 26/1411
USPC .................. 219/121.6, 121.47, 121.85, 76.1, 219/121.63, 121.64, 121.12; 427/596, 566, 427/474, 475, 572; 118/321, 323, 620, 621, 118/631, 641; 148/525, 526, 903
See application file for complete search history.

(56) References Cited

U.S. PATENT DOCUMENTS 3,872,279 A * 3/1975 Fairbairn ................ 219/121.47
3,947,653 A * 3/1976 Fairbairn .................... 219/76.1
(Continued)

FOREIGN PATENT DOCUMENTS

CN  101016610 A  8/2007
CN  101111630 A  1/2008
(Continued)

OTHER PUBLICATIONS

International Search Report dated Sep. 30, 2011, International Application No. PCT/US2010/058953, Interntional Filing Date: Dec. 3, 2010.
(Continued)

*Primary Examiner* — Karl Kurple
(74) *Attorney, Agent, or Firm* — Harness, Dickey & Pierce, PLC

(57) ABSTRACT

A cold spray nozzle assembly for applying a coating of particles to a substrate includes a nozzle defining an inner passage with a nozzle exit. The nozzle assembly also includes a particle supply member in communication with the inner passage. The particle supply member supplies the particles to flow and accelerate through the inner passage and out of the nozzle via the nozzle exit toward the substrate to be coated thereon. Furthermore, the nozzle assembly includes a laser that emits a laser beam that is transmitted through the inner passage. The laser heats at least one of the particles and the substrate to promote coating of the substrate with the particles.

6 Claims, 3 Drawing Sheets

(51) Int. Cl.
  *B05B 7/16* (2006.01)
  *B05B 7/14* (2006.01)
  *B05D 1/12* (2006.01)
  *B05D 3/06* (2006.01)
  *C23C 24/04* (2006.01)
  *B23K 26/14* (2014.01)
  *B05C 19/00* (2006.01)

(52) U.S. Cl.
  CPC .............. *C23C 24/04* (2013.01); *C23C 24/08* (2013.01); *C23C 24/082* (2013.01); *B05C 19/008* (2013.01)

(56) References Cited

U.S. PATENT DOCUMENTS

| | | | |
|---|---|---|---|
| 3,947,654 A * | 3/1976 | Fairbairn | 219/121.85 |
| 4,050,408 A * | 9/1977 | Beucherie | C23C 14/228 |
| | | | 118/723 IR |
| 4,200,669 A * | 4/1980 | Schaefer et al. | 427/596 |
| 4,299,860 A * | 11/1981 | Schaefer et al. | 427/556 |
| 4,323,756 A * | 4/1982 | Brown et al. | 219/121.66 |
| 4,724,299 A * | 2/1988 | Hammeke | 219/121.6 |
| 4,741,286 A * | 5/1988 | Itoh | B05B 7/226 |
| | | | 118/620 |
| 4,927,992 A * | 5/1990 | Whitlow et al. | 219/121.65 |
| 4,947,463 A * | 8/1990 | Matsuda et al. | 219/121.85 |
| 4,958,058 A * | 9/1990 | Scheidt et al. | 219/121.6 |
| 4,991,541 A * | 2/1991 | Sugata et al. | 118/716 |
| 5,043,548 A * | 8/1991 | Whitney et al. | 219/121.47 |
| 5,271,965 A * | 12/1993 | Browning | 427/446 |
| 5,283,990 A * | 2/1994 | Shank, Jr. | B05B 1/044 |
| | | | 239/592 |
| 5,302,414 A * | 4/1994 | Alkhimov et al. | 427/192 |
| 5,306,330 A * | 4/1994 | Nasikas | B01D 45/12 |
| | | | 55/394 |
| 5,356,674 A * | 10/1994 | Henne | C23C 4/128 |
| | | | 427/189 |
| 5,418,350 A * | 5/1995 | Freneaux et al. | 219/121.84 |
| 5,449,536 A * | 9/1995 | Funkhouser et al. | 427/597 |
| 5,477,026 A * | 12/1995 | Buongiorno | 219/121.84 |
| 5,704,825 A * | 1/1998 | LeCompte | B05B 1/00 |
| | | | 239/594 |
| 5,795,626 A * | 8/1998 | Gabel et al. | 427/458 |
| 5,814,152 A * | 9/1998 | Thaler | 118/641 |
| 5,961,862 A * | 10/1999 | Lewis et al. | 219/121.84 |
| 6,046,426 A * | 4/2000 | Jeantette et al. | 219/121.63 |
| 6,074,135 A | 6/2000 | Tapphorn et al. | |
| 6,122,564 A * | 9/2000 | Koch et al. | 700/123 |
| 6,139,913 A * | 10/2000 | Van Steenkiste | B05B 7/1486 |
| | | | 427/189 |
| 6,203,861 B1 * | 3/2001 | Kar et al. | 427/554 |
| 6,396,025 B1 * | 5/2002 | Pyritz et al. | 219/121.63 |
| 6,402,050 B1 * | 6/2002 | Kashirin | B05B 7/1404 |
| | | | 239/135 |
| 6,534,745 B1 * | 3/2003 | Lowney | 219/121.84 |
| 6,623,796 B1 * | 9/2003 | Van Steenkiste | B05B 7/1486 |
| | | | 427/189 |
| 6,800,226 B1 * | 10/2004 | Gerking | D01D 4/025 |
| | | | 264/177.13 |
| 6,808,755 B2 * | 10/2004 | Miyamoto et al. | 427/446 |
| 6,894,247 B2 * | 5/2005 | Renteria et al. | 219/121.63 |
| 6,913,207 B2 * | 7/2005 | Miyamoto et al. | 239/135 |
| 6,994,894 B2 * | 2/2006 | Hofmeister | 427/596 |
| 7,043,330 B2 * | 5/2006 | Toyserkani et al. | 700/123 |
| 7,045,738 B1 * | 5/2006 | Kovacevic et al. | 219/121.63 |
| 7,108,894 B2 * | 9/2006 | Renn | 427/596 |
| 7,139,633 B2 * | 11/2006 | Mazumder et al. | 700/123 |
| 7,143,967 B2 * | 12/2006 | Heinrich | B05B 7/0441 |
| | | | 239/423 |
| 7,259,353 B2 * | 8/2007 | Guo | 219/121.63 |
| 7,582,846 B2 | 9/2009 | Molz et al. | |
| 7,605,346 B2 * | 10/2009 | Harris et al. | 219/121.84 |
| 7,705,264 B2 * | 4/2010 | Hoebel et al. | 219/121.64 |
| 7,765,022 B2 * | 7/2010 | Mazumder et al. | 700/121 |
| 7,951,412 B2 * | 5/2011 | Justin et al. | 427/2.1 |
| 8,020,509 B2 * | 9/2011 | Calla et al. | 118/308 |
| 8,021,715 B2 * | 9/2011 | Jensen et al. | 427/189 |
| 8,117,985 B2 * | 2/2012 | Whitfield | 118/641 |
| 8,561,668 B2 * | 10/2013 | Castle et al. | 164/4.1 |
| 2001/0042508 A1 | 11/2001 | Kay et al. | |
| 2003/0185995 A1 * | 10/2003 | Miyamoto et al. | 427/446 |
| 2004/0058065 A1 * | 3/2004 | Steenkiste | C23C 4/12 |
| | | | 427/180 |
| 2004/0164190 A1 * | 8/2004 | Baumann | B05B 3/1035 |
| | | | 239/700 |
| 2004/0166247 A1 * | 8/2004 | Heinrich | B05B 7/0441 |
| | | | 427/446 |
| 2004/0202797 A1 * | 10/2004 | Ginder | H01F 41/16 |
| | | | 427/598 |
| 2005/0077373 A1 * | 4/2005 | Ikeda | B60T 13/52 |
| | | | 239/34 |
| 2005/0077380 A1 * | 4/2005 | Miyamoto et al. | 239/135 |
| 2005/0214474 A1 * | 9/2005 | Han | C23C 24/04 |
| | | | 427/446 |
| 2005/0252450 A1 * | 11/2005 | Kowalsky et al. | 118/715 |
| 2006/0081570 A1 * | 4/2006 | Schildgen | 219/121.64 |
| 2006/0133947 A1 * | 6/2006 | DeBiccari et al. | 419/8 |
| 2006/0134347 A1 * | 6/2006 | Chiruvolu | C23C 8/00 |
| | | | 427/585 |
| 2006/0201418 A1 * | 9/2006 | Ko | B05B 7/1486 |
| | | | 118/308 |
| 2007/0065678 A1 * | 3/2007 | Ko | C23C 16/4586 |
| | | | 428/698 |
| 2007/0138147 A1 * | 6/2007 | Molz | B23K 10/027 |
| | | | 219/121.47 |
| 2007/0183919 A1 | 8/2007 | Ayer et al. | |
| 2007/0194085 A1 * | 8/2007 | Spinella et al. | 228/101 |
| 2007/0241060 A1 * | 10/2007 | Kolb | B01F 5/0646 |
| | | | 366/176.1 |
| 2007/0243335 A1 * | 10/2007 | Belashchenko | B22F 1/0096 |
| | | | 427/451 |
| 2009/0155461 A1 * | 6/2009 | Jabado | C23C 24/04 |
| | | | 427/180 |
| 2009/0288601 A1 * | 11/2009 | Bi et al. | 118/722 |
| 2009/0324401 A1 * | 12/2009 | Calla | 415/200 |
| 2010/0098845 A1 * | 4/2010 | Jensen et al. | 427/185 |
| 2010/0143700 A1 * | 6/2010 | Champagne et al. | 428/323 |
| 2010/0151124 A1 * | 6/2010 | Xue | C23C 24/04 |
| | | | 427/185 |
| 2010/0173087 A1 * | 7/2010 | Calla et al. | 427/421.1 |
| 2010/0183826 A1 * | 7/2010 | Janz et al. | 427/575 |
| 2010/0320176 A1 * | 12/2010 | Mohanty et al. | 219/121.37 |
| 2011/0052824 A1 * | 3/2011 | Venkatachalapathy | B05B 7/1486 |
| | | | 427/421.1 |
| 2012/0021026 A1 * | 1/2012 | Glenn, Jr. | A61K 9/70 |
| | | | 424/401 |
| 2012/0199564 A1 * | 8/2012 | Washko et al. | 219/121.63 |
| 2012/0240852 A1 * | 9/2012 | Ewers | 118/666 |
| 2012/0269958 A1 * | 10/2012 | Subramanian et al. | 427/9 |
| 2013/0004673 A1 * | 1/2013 | Ikeda | B05B 7/205 |
| | | | 427/421.1 |
| 2014/0065320 A1 * | 3/2014 | Lin et al. | 427/554 |

FOREIGN PATENT DOCUMENTS

| | | |
|---|---|---|
| CN | 101208447 A | 6/2008 |
| GB | 2439934 A | 1/2008 |
| JP | 2002016058 A | 1/2002 |
| JP | 2008080323 A | 4/2008 |
| JP | 2008540115 A | 11/2008 |
| JP | 2008302317 A | 12/2008 |
| WO | WO-9116146 A1 | 10/1991 |

OTHER PUBLICATIONS

Written Opinion dated Sep. 30, 2011, International Application No. PCT/US2010/058953, Interntional Filing Date: Dec. 3, 2010.

Brückner, S., Viöl, W., and Wieneke, S., "Interaction of Short Laser Pulses with Gases and Ionized Gases," Coherence and Ultrashort Pulse Laser Emission, Dr. F. J. Duarte (Ed.), (Nov. 2010), pp. 383-402, ISBN: 978-953-307-242-5, InTech, DOI: 10.5772/13102.

(56) References Cited

OTHER PUBLICATIONS

Available from: http://www.intechopen.com/books/coherence-and-ultrashort-pulse-laser-emission/interaction-of-short-laser-pulses-with-gases-and-ionized-gases.

Ciarrocca, M., Marangos, J.P., Burgess, D.D., Hutchinson, M.H.R., Smith, R.A., Rae, S.C., Burnett, K., "Spectral and spatial modifications to an intense 1 μm laser pulse interacting with a dense argon gas," Optics Communications 110 (3), (Aug. 1994), pp. 425-434.

Karthikeyan, J., "Cold Spray Process," ASM Handbook vol. 5A, Thermal Spray Technology, R.C. Tucker, Jr., Editor, 2013, pp. 54-59.

Panarella, E., "Theory of Laser-Induced Gas Ionization," Foundations of Physics, vol. 4, No. 2, 1974, pp. 227-259.

Rae, S.C., "Ionization-induced defocusing of intense laser pulses in high-pressure gases," Optics Communications vol. 97, Isss. 1-2, (Mar. 1993), pp. 25-28.

Kuroda, S., Kaihara, S., Fuji, S., Kinoshita, T., Adachi, M., "Modeling of particle generation in laser ablation plasma," Journal of Aerosol Science 50 (2012), pp. 38-56.

First Japanese Office Action, Application No. 2012-542224, dated May 20, 2014, Translation by Asamura Patent Office, p.c., dated Jun. 25, 2014, 7 pages.

Supplementary European Search Report in Correspondending International Application No. EP10835212.1, mailed Nov. 18, 2014, 6 pages.

First Office Action, Chinese Application No. 201080061809.5, dated Aug. 5, 2014, Translation by Unitalen Attorneys at Law, 21 pages.

Second Chinese Office Action regarding Chinese Application No. 201080061809.5, mailed Mar. 20, 2015. Translation provided by Unitalen Attorneys at Law.

Third Chinese Office Action regarding Chinese Application No. 201080061809.5, mailed Mar. 18, 2016.

\* cited by examiner

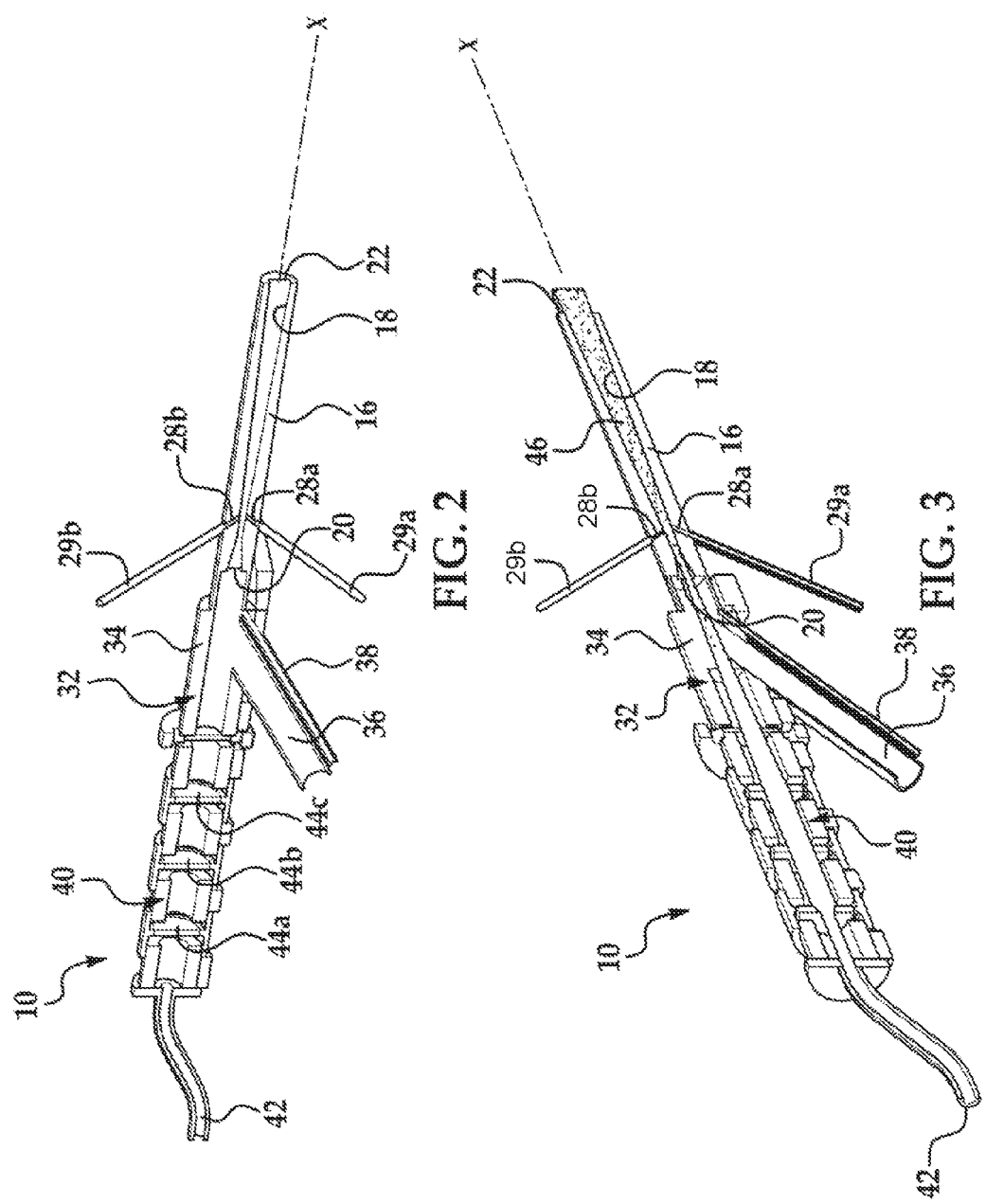

COAXIAL LASER ASSISTED COLD SPRAY NOZZLE

CROSS-REFERENCE TO RELATED APPLICATIONS

This application claims the benefit of U.S. Provisional Application No. 61/266,639, filed on Dec. 4, 2009. The entire disclosure of the above application is incorporated herein by reference.

GOVERNMENT RIGHTS

This invention was made with government support under grant number N00244-07-P-0553 awarded by the United States Navy. The government has certain rights in the invention.

FIELD

The present disclosure relates to thermal spray coating and, more particularly, to a coaxial laser assisted cold spray nozzle.

BACKGROUND

This section provides background information related to the present disclosure which is not necessarily prior art.

Thermal spraying is a technique used for coating a substrate, for instance, to protect the substrate against corrosion. Cold spraying is a type of thermal spraying in which a stream of solid particles is accelerated to high speeds by a carrier gas through a nozzle toward the substrate. The particles have enough kinetic energy upon impact with the substrate to deform plastically and bond metallurgically/mechanically to the substrate to form a coating.

The particles are accelerated to a critical velocity such that the coating can be created. This critical velocity can depend on the properties of the particles and the substrate (i.e., deformability, shape, size, temperature, etc.).

The particles can also be heated by the carrier gas in order to make the particles more plastic to deform upon impact. The amount of heat supplied from the gas can depend on the properties of the particles and the substrate.

Excessively hard substrates (e.g., tool steel) can be difficult to coat by cold spraying. This is because the substrate may not deform enough to allow the particles to bond and form the coating. The impact of the particles can also cause cracking of the substrate.

In addition, excessively soft substrates (e.g., polymers) can also be difficult to coat using cold spraying techniques. For instance, these substrates may be damaged by impact of the particles and/or the high temperatures of the gas used to accelerate the particles.

Furthermore, some particles may not be suitable for cold spraying. For instance, excessively hard particles (e.g., ceramics) may not deform sufficiently upon impact with the substrate to bond and coat the substrate.

SUMMARY

This section provides a general summary of the disclosure, and is not a comprehensive disclosure of its full scope or all of its features.

A cold spray nozzle assembly for applying a coating of particles to a substrate is disclosed. The nozzle assembly includes a nozzle defining an inner passage with a nozzle exit. The nozzle assembly also includes a particle supply member in communication with the inner passage. The particle supply member supplies the particles to flow and accelerate through the inner passage and out of the nozzle via the nozzle exit toward the substrate to be coated thereon. Furthermore, the nozzle assembly includes a laser that emits a laser beam that is transmitted through the inner passage. The laser heats at least one of the particles and the substrate to promote coating of the substrate with the particles.

Additionally, a method of applying a coating of particles to a substrate is disclosed. The method includes supplying the particles to flow and accelerate through an inner passage of a nozzle and out of the nozzle via a nozzle exit toward the substrate. The method further includes transmitting a laser beam through the inner passage to heat at least one of the particles and the substrate to promote coating of the substrate with the particles.

A cold spray nozzle assembly for applying a coating of particles to a substrate is also disclosed. The nozzle assembly includes a nozzle defining an inner passage with a nozzle entrance, a nozzle exit, and a substantially straight longitudinal axis that extends through both the nozzle entrance and the nozzle exit. The inner passage is rectangular in a cross section taken perpendicular to the longitudinal axis, and the cross section remains rectangular along the entire nozzle from the nozzle entrance to the nozzle exit. The inner passage also includes a convergent section adjacent the nozzle entrance and a divergent section adjacent the nozzle exit. The nozzle also includes a particle supply inlet that is in communication with the divergent section and that extends transverse to the longitudinal axis of the inner passage. The nozzle assembly also includes a particle supply member in communication with the particle supply inlet. The particle supply member supplies the particles to flow and accelerate through the inner passage and out of the nozzle via the nozzle exit toward the substrate to be coated thereon. Moreover, the nozzle assembly includes a gas supply member that supplies a gas to the inner passage to flow through the inner passage of the nozzle to accelerate the particles. Additionally, the nozzle assembly includes a laser that emits a laser beam that is transmitted into the nozzle via the nozzle entrance, through the inner passage, and out of the nozzle via the nozzle exit. The laser heats both the particles and the substrate to promote coating of the substrate with the particles. Furthermore, the nozzle assembly includes a handling device that moves at least one of the nozzle and the substrate relative to the other.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a longitudinal section view of the cold spray nozzle assembly of FIG. 1;

FIG. 3 is a longitudinal section view of the cold spray nozzle assembly of FIG. 1, shown during operation of a laser thereof;

Corresponding reference numerals indicate corresponding parts throughout the several views of the drawings.

DETAILED DESCRIPTION

Example embodiments will now be described more fully with reference to the accompanying drawings.

Referring initially to FIGS. 1-4, a cold spray nozzle assembly 10 is illustrated according to various exemplary embodiments of the present disclosure. The cold spray nozzle assembly 10 can be used for applying a coating 11 of particles 12 to a substrate 14 (FIGS. 1, 5, and 6) as will be described in greater detail below.

Figure 4:
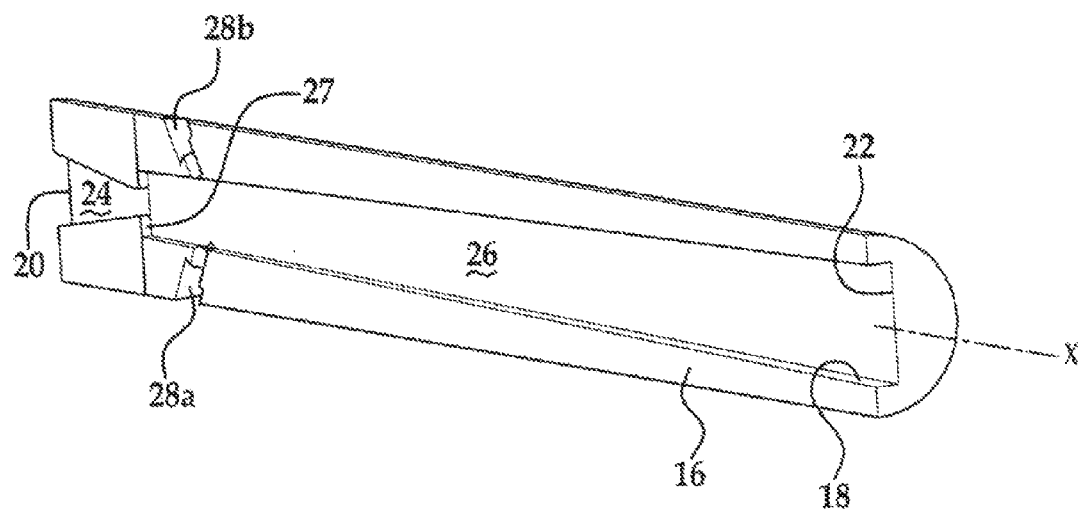
FIG. 4 is a longitudinal section view of a nozzle of the cold spray nozzle assembly of FIG. 1.

The assembly 10 can include a nozzle 16 having a substantially straight longitudinal axis X. As shown in FIGS. 2-4, the nozzle 16 can define an inner passage 18 that extends parallel to the axis X. The inner passage 18 can also include a nozzle entrance 20 and a nozzle exit 22 at opposite ends thereof (FIGS. 2-4). As best shown in FIG. 4, the inner passage 18 can include a convergent section 24 adjacent the nozzle entrance 20 and a divergent section 26 adjacent the nozzle exit 22. More specifically, both the convergent and divergent sections 24, 26 can be tapered. The convergent section 24 narrows moving away from the entrance 20, and the divergent section 26 widens moving toward the exit 22. The convergent section 24 is connected to the divergent section 26 to define a shoulder 27 (FIG. 4). As will be discussed, the particles 12 flow through the inner passage 18, and the convergent and divergent sections 24, 26 ensure an appropriate flow field in the passage 18 such that the particles 12 move at a sufficient velocity to coat the substrate 14.

Figure 1:
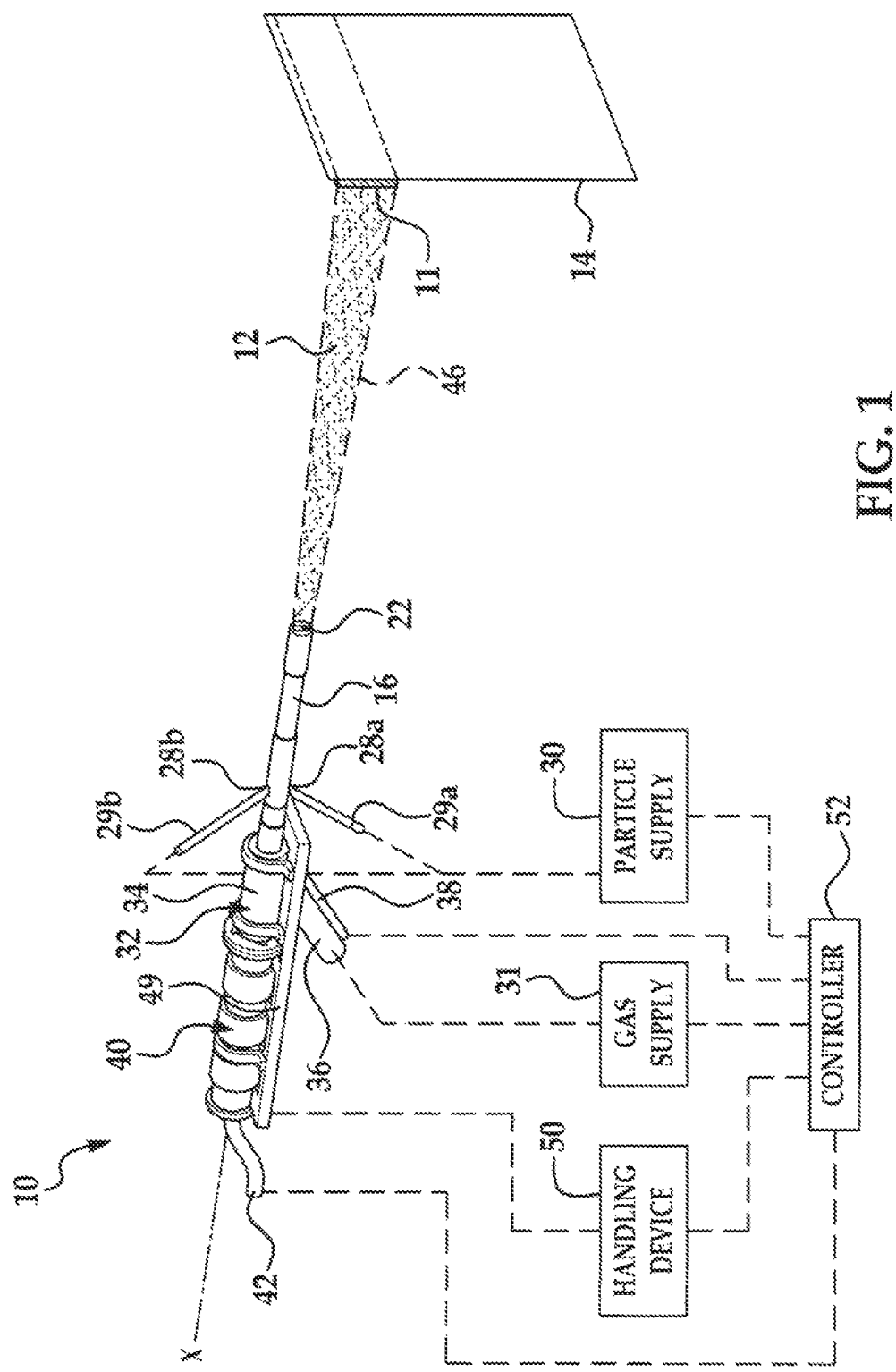
FIG. 1 is a perspective view of a cold spray nozzle assembly according to various exemplary embodiments of the present disclosure.

As shown in FIG. 1, the exit 22 can be substantially rectangular in shape. More specifically, the inner passage 18 can have a substantially rectangular cross section taken perpendicular to the axis X adjacent the exit 22. The entire inner passage 18 can have a similar substantially rectangular cross section along the entire axis X of the passage 18; however, it will be apparent that the area of such a cross section will change along the axis X due to the tapering of the convergent and divergent sections 24, 26. It will also be appreciated that the inner passage 18 and the exit 22 can alternatively have any suitable (non-rectangular) shape.

Furthermore, as shown in FIG. 4, the nozzle 16 can include one or more particle supply inlets 28a, 28b. The nozzle 16 can include any number of inlets 28a, 28b, and the inlets 28a, 28b can be disposed in any suitable location. In the embodiment shown, there are two inlets 28a, 28b disposed symmetrically on opposite sides of the axis X. The particle supply inlets 28a, 28b can each extend transverse to the axis X. For instance, the particle supply inlets 28a, 28b can each be disposed at a positive acute angle relative to the axis X and generally toward the exit 22.

As shown in FIG. 1, the assembly 10 can include a particle supply member, shown schematically at 30. The particle supply member 30 can be in (fluid) communication with the inner passage 18 of the nozzle 16 via the inlets 28a, 28b. For instance, the particle supply member 30 can include one or more tubes 29a, 29b (FIGS. 1-3) that are received in and operably coupled to the inlets 28a, 28b, respectively. Thus, as will be discussed, the particles 12 can be supplied from the tubes 29a, 29b of the supply member 30 to flow through the inlets 28a, 28b, through the inner passage 18, and out of the nozzle exit 22 toward the substrate 14 to coat the substrate 14 with the particles 12.

It will be appreciated that the particles 12 can be of any suitable type. For instance, the particles 12 can be metallic, polymeric, and/or ceramic powderized particles 12. Also, the particles 12 can be a composite mixture of metallic, polymeric, and/or ceramic particles 12.

Referring to FIGS. 1-3, the assembly 10 can further include a pressure tube 32. The pressure tube 32 can include a first branch 34, a second branch 36, and a third branch 38, each of which are hollow and that are in fluid communication with each other. The first, second, and third branches 34, 36, 38 can also be in fluid communication with the nozzle entrance 20. The first branch 34 can be directly fixed to the nozzle 16 so as to be coaxial with the axis X. The second branch 36 and the third branch 36, 38 can be disposed at an acute angle relative to the axis X and can be directed generally toward the nozzle entrance 20. The third branch 38 can be disposed between the second branch 36 and the nozzle entrance 20.

Moreover, as shown in FIG. 1, the assembly 10 can include a gas supply member 31. The gas supply member 31 can be in fluid communication with the second branch 36 of the pressure tube 32. The gas supply member 31 can supply any suitable gas to pressurize the inner passage 18 of the nozzle 16.

Moreover, the assembly 10 can include a laser 40. The laser 40 can be of any suitable type, such as a diode laser of a known type. The laser 40 can include a fiber-optic cable 42 and at least one or more (e.g., three) lenses 44a, 44b, 44c (FIG. 2). The laser 40 can be operably coupled to the first branch 34 of the pressure tube 32 so as to be substantially coaxial with the axis X. As will be discussed, the laser 40 can emit a laser beam 46 (FIGS. 1 and 3) that is transmitted through the entrance 20 of the inner passage 18 of the nozzle 16 and out of the nozzle 16 via the exit 22 toward the substrate 14. The laser beam 46 can be directed substantially parallel to and coaxial to the axis X toward the substrate 14, although some degree of spread of the beam 46 away from the axis X can occur.

As shown in FIG. 1, the assembly 10 can further include a platform 49 on which the pressure tube 32 and the laser 40 are mounted. The assembly 10 can also include a handling device 50 that moves the platform 49 and/or the substrate 14 relative to each other. In the embodiment shown, the handling device 50 is operably coupled to the platform 49 such that the platform 49 can move while the substrate 14 remains stationary; however, it will be appreciated that the handling device 50 could move the substrate 14 while the platform 49 remains stationary, or the handling device 50 could be configured to move both the platform 49 and the substrate 14 relative to each other. The handling device 50 can be of any suitable type, such as a robotic handling device 50. When the handling device 50 moves the platform 49, the laser 40, the pressure tube 32, and the nozzle 16 are moved as a unit relative to the substrate 14.

Additionally, the assembly 10 can include a controller 52. The controller 52 can be of any suitable type, such as a programmable computer. The controller 52 can be in communication with the laser 40, the handling device 50, the gas supply member 31, and the particle supply member 30 for operating each. The controller 52 can also be in communication with the third branch 38 for receiving feedback regarding the pressure inside the pressure tube 32 and the nozzle 16. For instance, a pressure sensor (not shown) can be operably coupled to the third branch 38 to detect pressure inside the pressure tube 32 and nozzle 16, and the pressure sensor can also provide correlative electronic feedback signals to the controller 52 for controlling the assembly 10.

During operation, the controller 52 can move the assembly 10 into a desired position relative to the substrate 14 using the handling device 50. When in proper position, the controller 52 can operate the laser 40 to emit the laser beam 46 through the pressure tube 32, through the nozzle 16, and toward the substrate 14. The energy of the laser beam 46 can heat the substrate 14 to make the substrate 14 more amenable to plastic deformation and to prepare the substrate 14 for coating. It will be appreciated that this "pre-treating" of the substrate 14 can be skipped in some embodiments, depending on the type of material of the substrate 14.

Also, in some embodiments, the controller 52 can cause the gas supply member 31 to supply gas into the inner passage 18 and to the substrate 14 before and during operation of the laser 40. As such, the gas can reduce the likelihood of oxidation of the substrate 14.

After the laser 40 has begun operating, the controller 52 can cause the particle supply member 30 to supply the particles 12. The particles 12 can be accelerated by the gas up to or beyond a critical velocity within the inner passage 18 and directed toward the substrate 14. The energy of the laser beam 46 can heat the particles 12 during flight toward the substrate 14. Because the particles 12 are heated, the particles 12 can plastically deform more readily when the particles 12 impact the substrate 14.

Furthermore, the energy of the laser beam 46 can continue to heat the substrate 14 as the particles 12 are ejected toward the substrate 14. Thus, the substrate 14 can plastically deform more readily.

Figure 5:
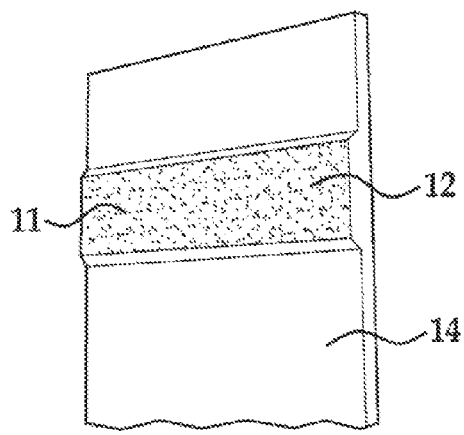
FIG. 5 is a photograph of a planar substrate that has been coated using the cold spray nozzle assembly of FIG. 1.
Figure 6:
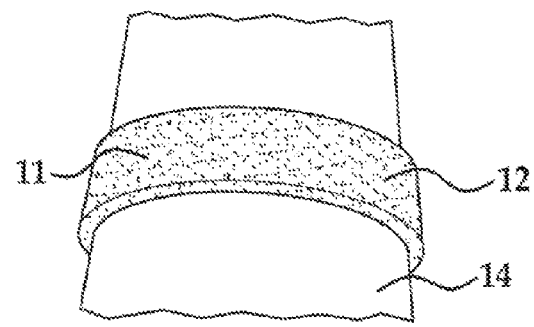
FIG. 6 is a photograph of a tubular substrate that has been coated using the cold spray nozzle assembly of FIG. 1.

The handling device 50 can continuously move the assembly 10 to evenly coat the substrate 14 with the particles 12 on predetermined areas. An example of the coating 11 on a planar substrate 14 is shown in FIG. 5, and an example of the coating 11 on a tubular substrate 14 is shown in FIG. 6.

Accordingly, the assembly 10 can be used to coat a substrate 14 with particles 12. A wider variety of substrates 14 can be used (e.g., harder or softer substrates 14) as compared with substrates typically used in cold spray coating processes. Specifically, the particles 12 can be supplied at relatively low pressures because heating of the particles 12 is caused by the laser 40 instead of just the high pressure gas as in prior art systems. Likewise, the critical velocity of the particles 12 can be reduced for the same reasons. For these reasons, the impact of the particles 12 is less likely to damage the substrate 14. Accordingly, the substrate 14 can be softer or harder than substrates typically coated by cold spray coating processes.

Also, a wider variety of particles 12 can be used (e.g., harder or softer composite particles 12) as compared with particles typically used in cold spray coating processes. This is because the laser 40 heats the particles 12 prior to impact with the substrate 14 and allows the particles 12 to more readily plastically deform.

In addition, the substrate 14 does not necessarily need to be protected from oxidation (e.g., in a protected environmental chamber). This is because the area of the substrate 14 affected by the laser beam 46 remains within the stream of gas supplied by the gas supply member 31.

Additionally, because of the rectangular cross section of the inner passage 18 and because of the rectangular shape of the nozzle exit 22, the particles 12 can be deposited at a fairly even thickness on the substrate 14 (see FIGS. 5 and 6) as compared with prior art systems. Accordingly, the finished part can be more aesthetically pleasing, can fit better to other parts, and can have better corrosion resistance due to in-situ annealing.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

What is claimed is:

1. A cold spray nozzle assembly for applying a coating of particles to a substrate comprising:
    a nozzle defining an inner passage extending in a flow direction from a convergent section adjacent a nozzle entrance through a throat to a divergent section adjacent a nozzle exit, each of the convergent section, the throat, and the divergent section of the inner passage is substantially rectangular in cross sectional planes that intersect perpendicularly and transversely to a longitudinal axis of the inner passage thereby having opposing minor side faces and major side faces;
    a gas supply member supplying a gas to the inner passage of the nozzle to flow through the inner passage of the nozzle and accelerate through the inner passage by passage through the convergent section, the throat, and the divergent section;
    a particle supply member in direct communication with only the minor side face of the divergent section of the inner passage, the particle supply member supplying the particles to flow in the gas supplied by the gas supply member, accelerate within the divergent section, and out of the nozzle via the nozzle exit toward the substrate to coat the substrate; and
    a laser that emits a laser beam that is transmitted through the inner passage containing the supplied gas, the laser heats the particles below the particles' melting point only in and downstream of the divergent passage and heats the substrate to promote cold spray coating of the substrate with the particles.

2. The cold spray nozzle assembly of claim 1, wherein the inner passage has a substantially straight longitudinal axis, and wherein the laser beam is directed substantially parallel and coaxial to the longitudinal axis, out of the nozzle exit, and toward the substrate.

3. The cold spray nozzle assembly of claim 2, wherein the inner passage includes a nozzle entrance, wherein the longitudinal axis extends through both the nozzle entrance and the nozzle exit, and wherein the laser is operably coupled to the nozzle such that the laser beam is transmitted into the nozzle via the nozzle entrance.

4. The cold spray nozzle assembly of claim 1, further comprising a pressure tube that is disposed between the laser and the nozzle, the pressure tube being in fluid communication with the inner passage, and further comprising a gas supply member that supplies a gas to the pressure tube to flow through the inner passage of the nozzle and out of the nozzle exit.

5. A cold spray nozzle assembly for applying a coating of particles to a substrate comprising:
    a nozzle defining an inner passage with a nozzle entrance, a nozzle exit, and a substantially straight longitudinal axis that extends through both the nozzle entrance and the nozzle exit, the inner passage being substantially rectangular in cross sectional planes that intersect perpendicularly and transversely to the longitudinal axis along its entirety thereby having opposing minor side faces and major side faces, the inner passage also including a convergent section adjacent the nozzle entrance and a divergent section downstream of the convergent section and adjacent the nozzle exit, the nozzle also including a particle supply inlet that is in direct communication with only the minor side face of the divergent section;

a particle supply member in communication with the particle supply inlet, the particle supply member supplying the particles to flow and accelerate within the divergent section, and out of the nozzle via the nozzle exit toward the substrate to be coated thereon;

a gas supply member that supplies a gas to the inner passage to flow through the inner passage of the nozzle to accelerate the particles;

a laser that emits a laser beam that is transmitted into the nozzle via the nozzle entrance, through the inner passage containing the supplied gas, and out of the nozzle via the nozzle exit, the laser heating both the particles below their melting point only in and downstream of the divergent passage and the substrate to promote cold spray coating of the substrate with the particles; and a handling device that moves at least one of the nozzle and the substrate relative to the other.

6. The cold spray nozzle assembly of claim 1, wherein the divergent section is larger than the convergent section at the throat resulting in formation of a shoulder at the throat, the shoulder being a flat surface parallel to the vertical planes perpendicular to the longitudinal axis of the inner passage, and wherein the particle supply member in direct communication with the divergent section of the inner passage is downstream from the shoulder.

* * * * *